United States Patent [19]

Oikawa et al.

[11] Patent Number: 5,771,637
[45] Date of Patent: Jun. 30, 1998

[54] PLASTIC LOWER SASH FOR VEHICLE WINDOW GLASS

[75] Inventors: Hiroshi Oikawa; Hiroshi Funada; Hiromitsu Yoshida, all of Soja, Japan

[73] Assignee: OM Corporation, Okayama, Japan

[21] Appl. No.: 808,484

[22] Filed: Mar. 3, 1997

[30] Foreign Application Priority Data

Mar. 5, 1996 [JP] Japan .................................. 8-047671

[51] Int. Cl.⁶ .................................................. E05D 13/00
[52] U.S. Cl. ................................. 49/416; 49/414; 49/348
[58] Field of Search ............................. 49/414, 415, 416, 49/428, 348, 349, 350, 351, 501

[56] References Cited

U.S. PATENT DOCUMENTS

| | | | |
|---|---|---|---|
| 1,142,954 | 6/1915 | Gaskill | 49/415 |
| 1,604,627 | 10/1926 | Bacher | 49/416 |
| 2,132,104 | 10/1938 | Froeliger | 49/415 |
| 2,534,687 | 12/1950 | Smith | 49/416 |
| 5,067,281 | 11/1991 | Dupuy . | |
| 5,345,718 | 9/1994 | Dupuy . | |

*Primary Examiner*—Jerry Redman
*Attorney, Agent, or Firm*—Koda & Androlia

[57] ABSTRACT

A lower sash installed inside a door panel of, for instance, the door of an automobile so as to guide and hold window glass that is accommodated inside the door panel, the lower sash having a structure in which the sash has a channel shape in cross section comprising an outer-panel-side outer wing and an inner-panel-side inner wing formed as an integral part on either side of a frame plate, truss-form openings are formed in the frame plate, glass guides, which are elastic projections and respectively face the outer wing and inner wing, are arranged in an alternating manner so as to positionally correspond to the truss-form openings, and the wall thickness of the outer wing or inner wing is made thicker at a lower panel attachment end than the upper door sash end; and these elements are molded into an integral plastic unit.

7 Claims, 4 Drawing Sheets

PLASTIC LOWER SASH FOR VEHICLE WINDOW GLASS

BACKGROUND OF THE INVENTION

1. Field of the Invention

The present invention relates to a lower sash which is installed inside the door panel of an automobile, etc., and which guides and holds a window glass when the window glass is accommodated inside the door panel.

2. Prior Art

A lower sash is a member which is installed inside the door panel of an automobile, etc. It guides and holds window glass accommodated inside the door panel, thus preventing rattling of the window glass. Ordinarily, this lower sash is connected to an upper sash inside the window frame. In early models of lower sashes, glass guides (glass runs) made of rubber were simply attached to sheet metal frames as structures for guiding and holding the window glass as disclosed in U.S. Pat. No. 5,067,281. In recent years, however, plastic lower sashes in which the frame and glass guides are formed as an integral unit have also been proposed in order to achieve a reduction in weight as disclosed in U.S. Pat. No. 5,345,718.

These prior art lower sashes require (1) an appropriate degree of resilience and (2) an appropriate degree of structural strength, especially in the glass guides, in order to prevent rattling of the window glass that might be caused by raising and lowering the window or by vibration of the automobile, etc. and further in order to absorb any error arising during the installation of the window glass. In recent years, it has also become necessary to consider (3) a reduction in the number of parts required and (4) a reduction in the weight of the sash. U.S. Pat. No. 5,345,718 attempts to solve the problem (4) above by making the respective members out of plastic. However, in the case of glass guides which consist of protruding tongue-form parts, the range in which the conflicting requirements (1) and (2) above can both be satisfied is narrow, and vehicle types to which the same design specifications can be applied are limited.

A close examination of the issues (3) and (4) described above shows that while plastic lower sashes are desirable, such plastic lower sashes suffer from problems peculiar to the material used, as well as structural problems. First of all, plastic glass guides have a lower elastic deformation limit than the rubber glass guides used in existing lower sashes; and in cases where an external pressure exceeding this elastic deformation limit is applied thereon (e.g., in cases where the door is violently opened or closed), an excessive load is applied to the plastic glass guides, and the guides are damaged.

Furthermore, in the case of plastic lower sashes, a method in which the frame and glass guides (which are separate members in existing models) are formed as an integral unit might be thought to be the optimal method of reducing the number of parts required. However, in order to achieve favorable guiding and holding of the window glass in various types of vehicles, while at the same time achieving a broad performance range with respect to the above issues (1) and (2) so that the number of different vehicle types to which the same design specifications can be applied is increased, it is necessary to increase the dimensional precision of the glass guides. Furthermore, in order to realize such high dimensional precision, it is necessary to use a metal mold for integral molding with as simple a structure as possible, and this metal mold must be given special consideration.

Moreover, the window glass holding force required in a lower sash is low at the upper end which is connected to the upper sash, and the force increases toward the lower end of the sash. In addition, when the window glass is completely accommodated inside the door panel, the lower sash becomes the main body to hold the window glass, and the holding force required at the lower end of the lower sash becomes considerable. A plastic lower sash has a low structural strength compared to a conventional lower sash consisting of a sheet metal frame; as a result, the following problem arises: specifically, when the window glass is more or less completely accommodated inside the door panel, a large load is applied to the thin portions at the lower end, which ordinarily consist of an outer panel side wing (hereafter abbreviated to "outer wing") or inner panel side wing (hereafter abbreviated to "inner wing") installed on either side of the frame in order to form glass guides, so that the outer wing or inner wing is easily damaged.

SUMMARY OF THE INVENTION

Accordingly, the object of the present invention is to provide an integrally molded plastic lower sash as a means of satisfying the requirements for a reduction in the number of parts of a lower sash and for a reduction in weight of a lower sash.

It is another object of the present invention to provide an improved structure of the glass guides and the lower ends of the outer and inner wings of the plastic lower sash so that the glass guides of the plastic lower sash have an appropriate resilience and structural strength.

The objects are accomplished by a unique structure for a lower sash of the present invention which is installed inside an automobile door panel formed by joining an outer panel and an inner panel and which guides and holds window glass that is accommodated inside the door panel, wherein:

the sash has a channel shape in cross section and has an outer wing and an inner wing on either side of a frame plate, truss-form openings are formed in the frame plate, glass guides consisting of elastic projections and respectively facing the outer wing and inner wing are formed and arranged in an alternating fashion, and the frame plate, the outer and inner wings and glass guides are molded into a single integral unit.

In the plastic lower sash of the present invention, a structure having a high structural strength is obtained while saving on the amount of material used by forming the truss-form openings in the frame plate. Furthermore, the glass guides (which are elastic projections) are arranged in an alternating pattern facing the outer wing or inner wing; accordingly, an appropriate degree of resilience can be obtained while increasing the structural strength; and the points at which the window glass is held can be appropriately spaced, so that the accommodated window glass can be held stably.

The term "truss-form openings" refers to triangular openings which are formed by beams laid obliquely across the plane of the frame plate; in this case, the truss-form openings are formed in two rows, with the base sides of the triangular openings arranged parallel to each other on opposite sides, and with the apices of the openings alternately projecting in opposite directions. In addition, the glass guides can be formed by causing the outer wing and inner wing to project inward by themselves; in this case as well, the lower sash can be molded as an integral unit by forming the glass guides in a specified relationship with the truss-form openings.

Furthermore, the glass guides are installed so that the glass guides alternately project inward from the edges of the respective wings in the same positions as the truss-form openings, and internal openings are formed in the projections which communicate with the truss-form openings. Accordingly, in the present invention, it is possible to construct the elastic projections as plate springs which have the form of beams supported at both ends. Moreover, by forming the truss-form openings into a shape or size so that the inside edges of the truss-form openings encompass the outside edges of the glass guides, it is possible to form the truss-form openings and glass guides at the same time using a metal mold which allows easy removal, thus increasing the dimensional precision of the glass guides.

In addition, by forming the wall thickness of the outer wing or inner wing thicker in the vicinity of the door panel attachment parts (formed at the lower end of the outer wing or inner wing) than in the upper portions of the outer wing or inner wing in order to maintain dimensional precision, it is possible increase the structural strength of the outer wing and inner wing, and therefore, the structural strength of the lower sash as a whole, can be increased with the dimensional precision maintained.

In the glass guides formed as plate springs in the shape of beams supported at both ends, if the internal openings are large, the resilience of the glass guides as such plate springs is increased; however, at the same time, the amount of deformation is also increased, so that there is a danger of damaging the glass guides by the load which is applied when the window glass is more or less completely accommodated inside the door panel. Accordingly, stopping projections which prevent excessive deformation of the glass guides by making inside contact with the opposite sides of the internal openings in the glass guides when the glass guides are deformed are formed on the wall surfaces of the internal openings. As a result of these stopping projections that make an inside contact with the opposite sides of the internal openings, the amount of deformation of the glass guides (which are elastic projections) is limited. Accordingly, the opening area of the internal openings, and therefore the opening area of the truss-form projections which communicate with the internal openings, can be increased, and the amount of material required can be reduced; thus making it possible to increase the resilient force of the glass guides while at the same time preventing the deformation of the glass guides from reaching the limit value.

In the glass guides formed as plate springs which have the form of beams supported at both ends, it is sufficient to form a single stopping projection which makes inside contact with the apex of the corresponding plate spring on the outer wing or inner wing facing the apex. However, it is also possible to form two stopping projections facing each other; i.e., one on the inside of the apex of the plate spring and one on the outer wing or inner wing facing the inside of the apex, so that both stopping projections can contact each other.

DETAILED DESCRIPTION OF THE INVENTION

Embodiments of the present invention will be described below with reference to the accompanying drawings.

Figure 1:
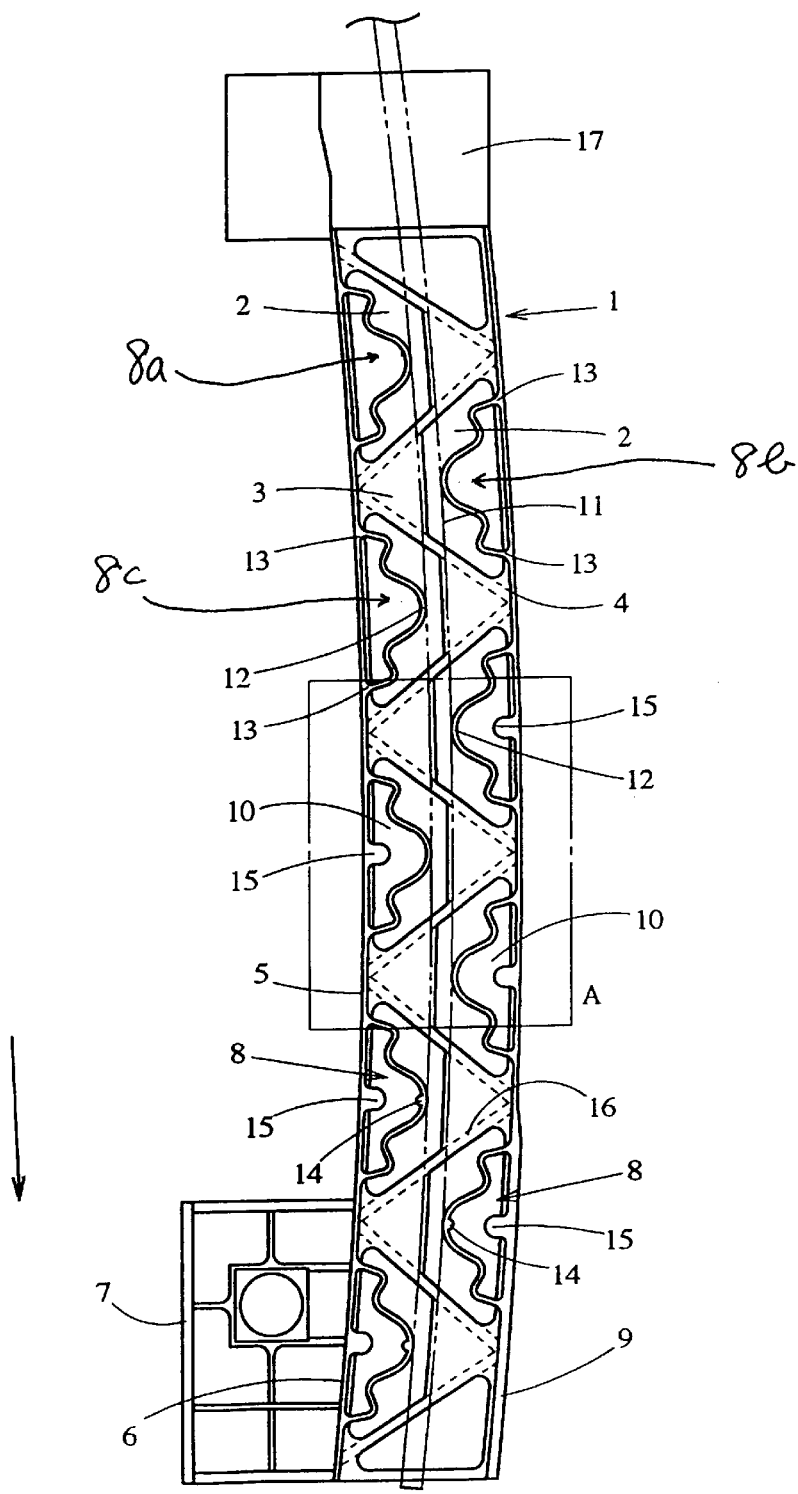
FIG. 1 is a front view of the plastic lower sash according to the embodiment of the present invention.

As shown in FIG. 1, the plastic lower sash 1 is integrally molded in the shape of a channel in cross section (see FIG. 2) by an elongated frame plate 2 and outer wing 4 and an inner wing 5 which are provided on both sides (length wise) of the frame plate 2. The outer and inner wings 4 and 5 are more or less parallel to the outer panel and inner panels (not shown) of door panels (of, for instance, an automobile) and provided so as to stand upright on both sides of the frame plate 3 at substantially right angles. The frame plate 3 is provided with a plurality of truss-form openings 2 which are arranged in zigzag configuration.

A door panel attachment 7 is formed at a lower portion 6 of the inner wing 5, and plurality of glass guides 8 are formed on the inner surfaces of the outer wing 4 and inner wing 5 which face each other so as to be located over (or at positions corresponding to) the plurality of truss-form openings 2. Moreover, the lower portion 9 of the outer wing 4 which faces the door panel attachment 7 of the inner wing 5 is formed thicker than the upper portion (or the remaining portions) of the outer wing 4.

Figure 2:
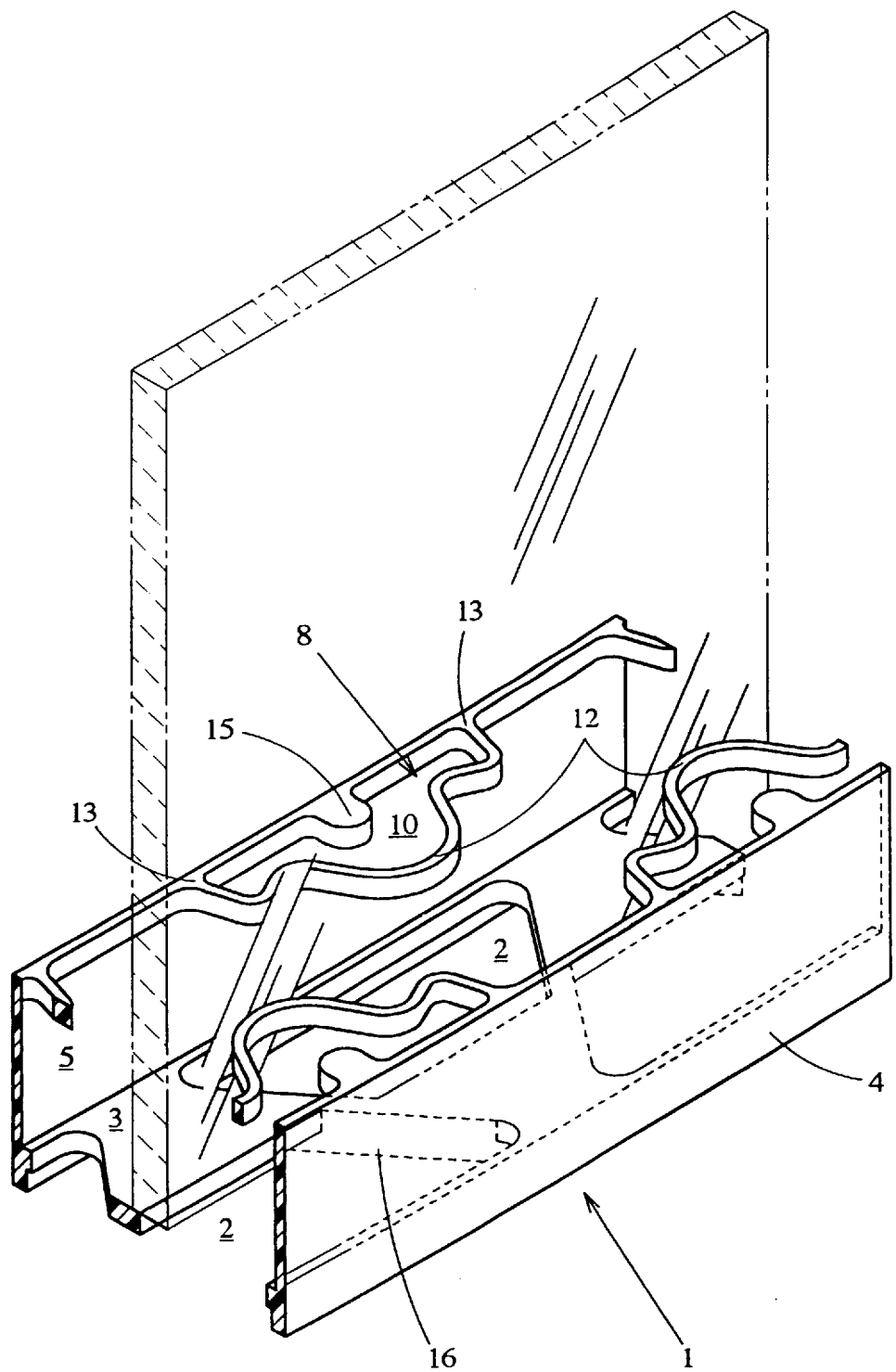
FIG. 2 is an enlarged perspective view of area A in FIG. 1.

As seen from FIG. 2, the shape of each of the truss-form openings 2 is trapezoidal; however, this shape can be a triangular or circular-arc-form shape.

As shown in FIG. 1 or 2, the glass guides 8 alternately (with respect to the length of the wings 4 and 5) project inwardly from the edges of the wings 4 and 5 in zigzag configuration so as to positionally correspond to the truss-from openings 2. Each of the glass guides 8 have the structure of wave-form plate springs in the form of beams supported at both ends by way of the formation of an internal opening 10. Thus, when a window glass 11 (indicated by the two-dot chain line in FIG. 1) is installed, the glass guides 8 can deform and guide and hold the window glass 11 by making rubbing contact with the window glass 11.

The spacing between the two base points 13 of the glass guides 8 (which are in a form of beams supported at both ends) depends upon the coefficient of elasticity. When distance between the base points 13 are widely spaced as in the present embodiment, an appropriate coefficient of elasticity is secured so that a resilient force which is suitable for guiding and holding the window glass is obtained. Furthermore, the respective glass guides 8 are arranged in an alternating fashion so as to positionally correspond to the truss-form openings 2, accordingly, the glass guides 8 can alternately successively make rubbing contact with both surfaces of the window glass 11, so that the window glass 11 is smoothly guided in and securely held by the glass guides 8.

When the window glass 11 oscillates in the lateral direction (as a result of violent opening or closing of the door, for example, after the sash has been installed), the glass guides 8 which guide and hold the window glass 11 are pressed against the window glass 11 and deformed, and the amount of such deformation is higher toward the lower portion of the door panel (as indicated by an arrow in FIG. 1). In the present embodiment, except for the upper three ranks of glass guides 8 (8a, 8b, 8c), the middle three ranks of glass guides 8 of each inner and outer wings 4 and 5 are provided with large stopping projections 15. Each projection 5 is formed on the wall surface of the internal opening 10 of each glass guide 8 so that the projection 6 faces and comes into contact with the inner surface of the apex 12 of the glass guide 8; and it is designed so that the amount of deformation of the glass guide 8 is limited until the inner surface of the apex 12 deforms and comes into contact with the large stopping projections 15. Thus, the deformation of each glass guide 8 is prevented from exceeding the elastic deformation limit. Furthermore, each of the glass guides 8 which are located in the bottom three ranks near the lower portions of the inner and outer wings 4 and 5 is provided, in addition to the large stopping projections 15, with small stopping projections 14 so as to be located on the inner surface of the apex 12 of the glass guide 8. As a result, the amount of deformation of the glass guides 8 is limited to an even smaller range, thus increasing the structural strength of the glass guides 8 at the lower portion of the door panel where the load applied by the accommodated window glass 11 is large.

The truss-form openings 2 of this embodiment are roughly trapezoidal openings, and the base sides thereof are parallel to the outer wing 4 or inner wing 5; in addition, these openings are arranged in two rows in which the openings are alternately oriented in opposite directions with reference to the inner and outer wings 4 and 5, so that the apical sides of the truss-form openings 2 are lined up along the bottom edge of the installed window glass 11. As shown in FIG. 1, each one of the truss-form openings 2 has a size in which the inside edge of the opening encompass the outside edge of the corresponding glass guide 8. Accordingly, the truss-form openings 2 and internal openings 10 can be formed at the same time by means of a mold (not shown) with a simple shape which communicates with the openings 2 and 10. Thus, in the plastic lower sash of the present invention, the glass guides 8, frame plate 3, outer wing 4, inner wing 5 and door panel attachment part 7 can all be molded as an integral unit. This makes it possible to simplify the manufacturing process and to realize a reduction in the amount of assembly work required as a result of reduction in the number of parts used. Furthermore, the truss-form openings 2 form a structure as if beams are formed to span the distance between the outer wing 4 and inner wing 5; as a result, these openings contribute to a reduction in weight and a saving of material, while at the same time increasing the structural strength of the frame plate 3.

Moreover, in this embodiment, reinforcing ribs 16 are formed at intervals on the frame plate 3 so as to improve the cross sectional coefficient of the frame plate 3 as well.

The structural strength of the frame plate 3 is thus increased; however, for the outer wing 4 and inner wing 5, the main purpose of these wings is to provide the glass guides 8 (which clamp the window glass 11) in an appropriate positional relationship facing each other. Accordingly, there is no need for a high structural strength along the entire length of the wings, and therefore, the wings are formed relatively thin. However, when the window glass 11 is in a more or less completely accommodated state, an excessively large load would be applied to the lower portion 9 of the outer wing 4 and/or the lower portion 6 of the inner wing 4 as a result of vibration of the automobile, etc. Accordingly, in the present embodiment, the structural strength of the lower portion 6 of the inner wing 5 is increased by integrally proving thereon the door panel attachment 7, and the structural strength of the lower portion 9 of the outer wing 4 is increased by making the wall thickness at the lower portion 9 thicker than the remaining portions of the outer wing 4 (that is, the intermediate portion and the upper portion 17 which connects with the upper sash as shown in FIG. 1). This area of increased wall thickness may be formed in a limited range extending upward to a prescribed height from the lower portion in the wing on which no attachment members such as the door panel attachment part 7, etc., are formed (i.e., the outer wing 4 in this embodiment, and the range and thickness of this are of increased wall thickness are determined by the structural strength required.

Figure 3:
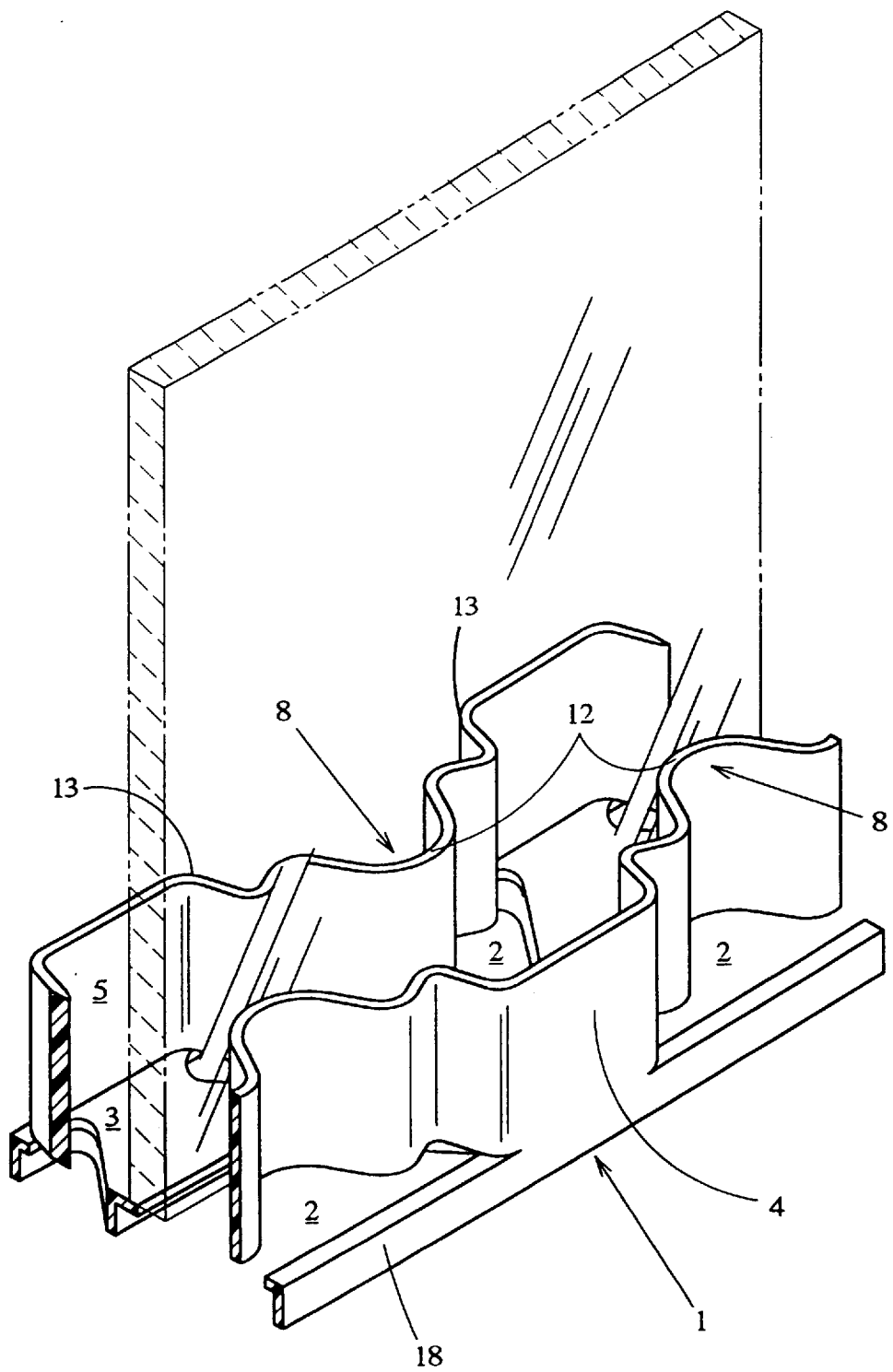
FIG. 3 and FIG. 4 are perspective views corresponding to FIG. 2 which illustrate other embodiments of the present invention.
Figure 4:
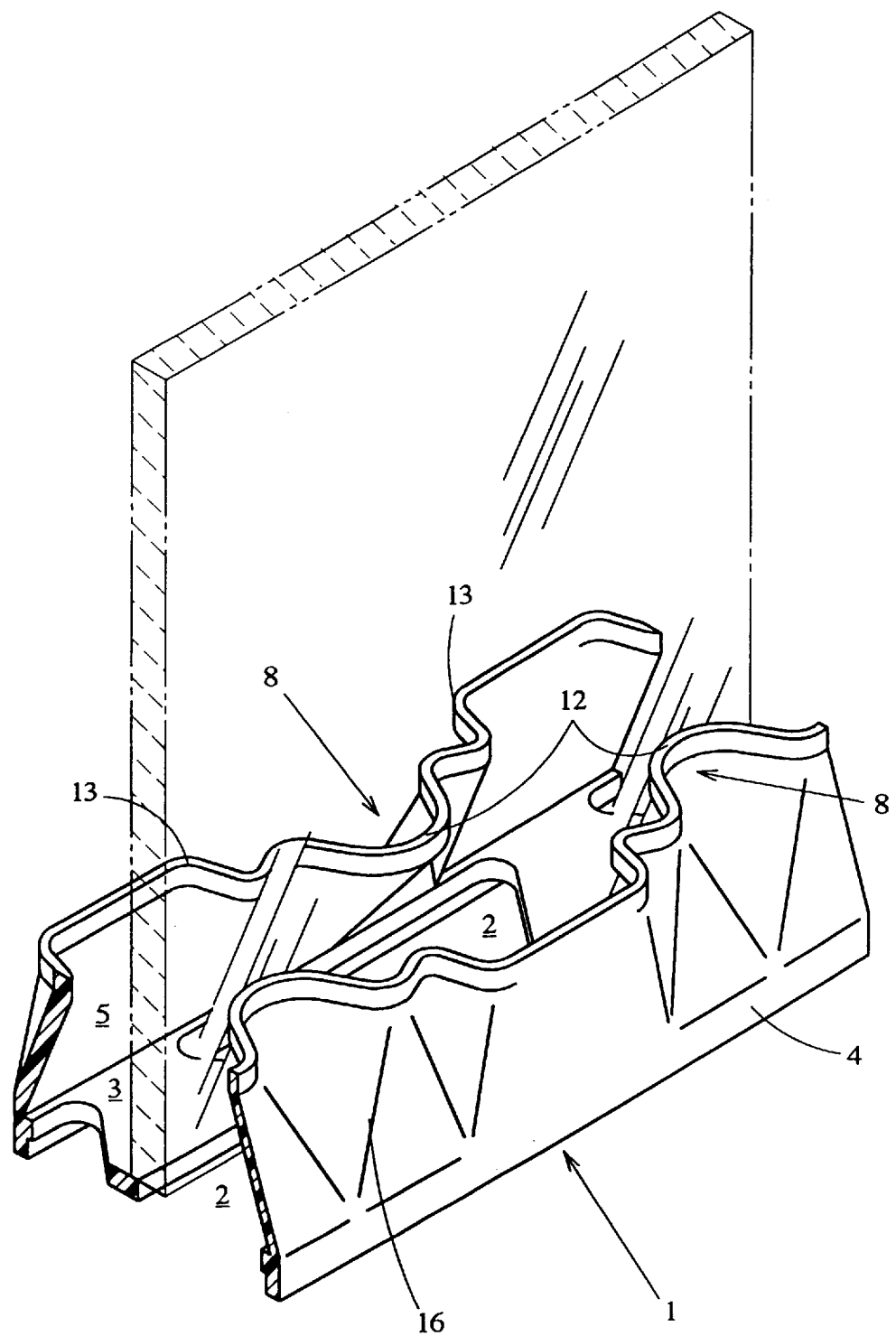

FIG. 3 and FIG. 4 illustrate other embodiments of the present invention which have the same function and effect as the structure illustrated in FIG. 2.

In the plastic lower sash 1 illustrated in FIG. 3, the area extending from the base points 13 to the apex 12 of each glass guide 8 in FIG. 2 is separated from the frame plate 3 and formed so as to cross the entire widths of the outer wing 4 and inner wing 5 so that the glass guides 8 alternately project inward in a wave-form configuration. In this case, the wing surfaces are provided with ribs 18 which project downward from the frame plate in order to compensate for the drop in the strength of the frame plate caused by the projection of the entire wing surfaces. The width D of each glass guide 8 may also be ½ or ⅓ the width of the wings rather than the entire width of the wings as shown in FIG. 3.

In the plastic lower sash 1 shown in FIG. 4, the glass guides 8 are formed across the entire widths of the outer wing 4 and inner wing 5 as in FIG. 3; in this case, however, the respective structures are not cut from the frame plate as shown in FIG. 3 but are instead continuously formed with the alternating inward inclinations in a wave-form configuration. In order to increase the strength of the apices 12 of the glass guides 8 which contact the glass, the portion between two base points 13 of each glass guide 8 is formed as a thick rib structure.

In both of the structures shown in FIG. 3 and FIG. 4, truss-form openings 2 are provided in the frame plate 3 for the formation of the glass guides 8 as in the structure shown in FIG. 2; accordingly, there is no drop in the strength of the lower sash 1, and integral plastic molding is possible.

In regard to the molding method used for the integrally molded plastic lower sash, injection molding is desirable; and the lower sash has a structure which can easily be removed from the mold. As for the type of plastic used, it is desirable to use a resin which is superior in terms of mechanical strength and rubbing properties, such as a polyacetal, polyethylene terephthalate, etc.

As seen from the above, the plastic lower sash of the present invention is an integral plastic molding that has both appropriate resilience and structural strength. Accordingly, the sash has lighter weight and requires less parts. Furthermore, a mold with a simple structure can be used, so that manufacturing costs can be controlled. In addition, the manufacturing process can be simplified, and the truss-form openings make it possible to increase the structural strength of the frame plate and the overall structural strength while achieving a reduction in weight and saving on the amount of material used.

Furthermore, the lower sash of the present invention can be manufactured as an integral plastic molding; accordingly, working such as the formation of stopping projections which mark off the elastic deformation limit on the inside walls of the internal openings in the glass guides can be easy, and thickening of walls for increasing the structural strength of the outer wing or inner wing, etc. can also be easy. Thus, there is no need for separate finishing work. As a result of such structural improvements, the present invention makes it possible to endow lower sashes having the same design specifications with performance values suited to window glasses used in numerous vehicle types, so that the unit manufacturing cost can be lowered by mass production.

We claim:

1. A lower sash installed inside a door panel formed by joining an outer panel and an inner panel so as to guide and hold a window glass that is accommodated inside said door panel, wherein said lower sash is a plastic lower sash having a channel shape in cross-section which has an outer-panel-side outer wing and an inner-panel-side inner wing on either side of a frame plate, truss-form openings are formed in said frame plate, glass guides which are elastic projections arranged in an alternating fashion so as to respectively face said outer and inner wings, and said frame plate, outer wing, inner wing and glass guides are molded as an integral unit.

2. A lower sash according to claim 1, wherein said glass guides alternately project inward from edges of said wings so as to be at same positions as said truss-form openings, each of said glass guides having an internal opening which communicate with each of said truss-form openings, and said truss-form openings having a shape and size in which an inner edge of said each of said truss-form openings encompass outer edges of said glass guides.

3. A lower sash according to claim 2, wherein each of said glass guides is provided on an inner wall surface of an internal opening thereof with a stopping projection which contacts an opposite surface when an apex portion of said glass guide is pressed and deformed by said window glass, thus preventing excessive deformation of said glass guides.

4. A lower sash according to claim 1, wherein said glass guides are formed, at positions corresponding to said truss-form openings, by separating said frame plate from said outer wing and a inner wing and alternately project inward in a wave-form fashion, and said truss-form openings have a shape and size in which inside edges of said truss-form openings encompass outside edges of said glass guides.

5. A lower sash according to claim 1, wherein said glass guides are formed, at positions corresponding to said truss-form openings, are continuously formed by causing said outer wing and said inner wing to alternately incline inward from said frame plate in a wave-form fashion, and said truss-form openings have a shape and size in which inside edges of said truss-form openings encompass outside edges of said glass guides.

6. A lower sash according to claim 1, wherein a wall thickness of a lower portion of said outer wing and of an area in the vicinity of a door panel which is formed at a lower portion of said inner wing is thicker compared to portions which are located at upper portions of said inner and outer wings so as to be connected to an upper sash.

7. A lower sash made from plastic and used for vehicle window glass comprising:

an elongated frame plate provided therein with a plurality of truss-form openings arranged in zigzag configuration along a length of said frame plate;

a first wing and a second wing extending substantially at right angles from both edges of said frame plate, thus forming a channel shape in cross section; and a plurality of glass guides formed on inner surfaces of said first and second wings which face each other, said plurality of glass guides being inward elastic projections and arranged in zigzag configuration so as to positionally correspond to said plurality of truss-form openings.

* * * * *